US011484830B2

(12) United States Patent
Eom et al.

(10) Patent No.: US 11,484,830 B2
(45) Date of Patent: Nov. 1, 2022

(54) CARBON DIOXIDE SEPARATOR

(71) Applicants: KOREA ELECTRIC POWER CORPORATION, Naju-si (KR); KOREA SOUTH POWER CO., LTD., Busan (KR); KOREA SOUTH-EAST POWER CO., LTD., Jinju-si (KR); KOREA MIDLAND POWER CO., LTD., Boryeong-si (KR); KOREA WESTERN POWER CO., LTD., Taean-gun (KR)

(72) Inventors: Tae Hyoung Eom, Sejong (KR); Joong Beom Lee, Daejeon (KR); Ui Sik Kim, Daejeon (KR); Hyun Geun Jo, Daejeon (KR); Joong Won Lee, Daejeon (KR)

(73) Assignees: KOREA ELECTRIC POWER CORPORATION, Naju-si (KR); KOREA SOUTH POWER CO., LTD., Busan (KR); KOREA SOUTH-EAST POWER CO., LTD., Jinju-si (KR); KOREA MIDLAND POWER CO., LTD., Boryeong-si (KR); KOREA WESTERN POWER CO., LTD., Taean-gun (KR)

( * ) Notice: Subject to any disclaimer, the term of this patent is extended or adjusted under 35 U.S.C. 154(b) by 880 days.

(21) Appl. No.: 16/339,998

(22) PCT Filed: Nov. 30, 2016

(86) PCT No.: PCT/KR2016/013961
§ 371 (c)(1),
(2) Date: Apr. 5, 2019

(87) PCT Pub. No.: WO2018/066756
PCT Pub. Date: Apr. 12, 2018

(65) Prior Publication Data
US 2020/0038806 A1 Feb. 6, 2020

(30) Foreign Application Priority Data
Oct. 7, 2016 (KR) .......... 10-2016-0129888

(51) Int. Cl.
*B01D 53/62* (2006.01)
*B01D 53/83* (2006.01)
*B01D 53/96* (2006.01)
*B01D 53/22* (2006.01)
*B01D 71/02* (2006.01)
*B01D 45/16* (2006.01)
(Continued)

(52) U.S. Cl.
CPC ............. *B01D 53/62* (2013.01); *B01D 45/16* (2013.01); *B01D 53/229* (2013.01); *B01D 53/83* (2013.01); *B01D 53/96* (2013.01); *B01D 71/027* (2013.01); *B04C 5/24* (2013.01); *B04C 9/00* (2013.01); *B01D 2251/306* (2013.01); *B01D 2251/606* (2013.01); *B01D 2253/112* (2013.01); *B01D 2257/504* (2013.01); *B01D 2258/0283* (2013.01)

(58) Field of Classification Search
CPC ............. B01D 2257/504; B01D 53/06; B01D 2258/0283; B01D 2253/112; B01D 53/83; B01D 71/027; B01D 2311/04; B01D 53/62; B01D 2311/2626; B01D 2251/606; B01D 2251/306; B01D 53/96; B01D 53/229; B01D 2311/06; B01D 45/16; Y02C 20/40; B04C 5/24; B04C 9/00
See application file for complete search history.

(56) References Cited

U.S. PATENT DOCUMENTS

| 4,444,571 A | * | 4/1984 | Matson ............... B01D 53/229 95/52 |
| 5,772,734 A | | 6/1998 | Baker et al. |
| 7,875,101 B2 | | 1/2011 | Staiger et al. |

(Continued)

FOREIGN PATENT DOCUMENTS

| CN | 104722177 A | 6/2015 |
| CN | 105597495 A | 5/2016 |
| KR | 10-2013-0039185 A | 4/2013 |

OTHER PUBLICATIONS

Chinese Office Action dated Mar. 30, 2021 of the Chinese Patent Application No. 201680089936.3, which corresponds to the present application.

(Continued)

*Primary Examiner* — Timothy C Vanoy
(74) *Attorney, Agent, or Firm* — Foundation Law Group, LLP

(57) ABSTRACT

A carbon dioxide separator includes an absorption tower for producing a carbon dioxide-rich absorbent and a carbon dioxide-depleted flue gas by reaction of a carbon dioxide-containing flue gas and an absorbent contained therein; a regeneration tower for removing the carbon dioxide-rich absorbent transferred from the absorption tower in the presence of the flowing gas to separate the same into a carbon dioxide-rich treatment gas and a carbon dioxide-lean absorbent; and a separation membrane module for selectively membrane-separating and concentrating the carbon dioxide, wherein the carbon dioxide-containing flue gas is transferred to the absorption tower as a carbon dioxide-lean flue gas obtained via the separation membrane module, and the flowing gas is transferred to the regeneration tower as the carbon dioxide-rich flue gas obtained via the separation membrane module from the carbon dioxide-containing flue gas.

12 Claims, 2 Drawing Sheets

(51) Int. Cl.
  B04C 5/24    (2006.01)
  B04C 9/00    (2006.01)

(56) References Cited

U.S. PATENT DOCUMENTS

| 2011/0290111 A1 | 12/2011 | Dunne et al. |
| 2012/0111192 A1 | 5/2012 | Nazarko et al. |
| 2013/0087047 A1 | 4/2013 | Yi et al. |

OTHER PUBLICATIONS

Communication from Korean Intellectual Property Office for Office Action dated Jul. 19, 2017 of the Korean patent application No. 10-2016-0129888, which corresponds to the present application.
Communication from Korean Intellectual Property Office for 2nd Office Action dated Jan. 11, 2018 of the Korean patent application No. 10-2016-0129888, which corresponds to the present application.

* cited by examiner

CARBON DIOXIDE SEPARATOR

CROSS-REFERENCE TO RELATED APPLICATIONS

This application is the National Stage filing under 35 U.S.C. 371 of International Application No. PCT/KR2016/013961, filed on Nov. 30, 2016, which claims the benefit of earlier filing date and right of priority to Korean Application No. 10-2016-0129888, filed on Oct. 7, 2016, the contents of which are all hereby incorporated by reference herein in their entirety.

TECHNICAL FIELD

The present invention relates to a carbon dioxide separator (capturing device) capable of stably storing carbon dioxide by separating carbon dioxide from a large amount of carbon dioxide emission sources.

BACKGROUND ART

Examples of a method for separating carbon dioxide from a carbon dioxide emission source such as a combustion flue gas or a process exhaust gas include an absorption method, a distillation method, an adsorption method, a membrane separation method, and the like. Among the above-described methods, as the absorption method, a wet absorption method in which carbon dioxide is selectively separated by bringing a mixed gas containing carbon dioxide in contact with an aqueous solution including amine, ammonia, potassium carbonate, or the like has been used.

However, in the above-described wet absorption method, an aqueous solution including amine, ammonia, potassium carbonate, or the like is used as an absorbent, so that there are problems in that organic contaminants and wastewater are generated to cause environmental pollution, and a large amount of energy is consumed for regenerating the absorbent.

A dry absorption method has been proposed in which organic pollutants and wastewater are generated in small amounts and carbon dioxide is captured by using a solid absorbent which has a relatively rapid reaction rate with carbon dioxide in order to solve the above-described problems. However, the dry absorption method is advantageous in separating carbon dioxide from an emission source containing carbon dioxide at a relatively low concentration, but has a problem in that the efficiency is not high for separating carbon dioxide from an emission source containing carbon dioxide at a high concentration (<15%) due to the limitation in absorption amount of solid absorbent.

In this case, it is possible to increase the separation efficiency of carbon dioxide by increasing the amount of solid absorbent recycled, but as the amount of solid absorbent recycled is increased, the abrasion loss amount of solid absorbent is also increased, and as a result, there is a limitation in increasing the separation efficiency of carbon dioxide.

Further, in a carbon dioxide separator operated by the dry absorption method, a part of the finally obtained high-purity carbon dioxide is used as a fluidizing gas of a regeneration tower for regenerating the solid absorbent, but in this case, when high-purity carbon dioxide flows in the regeneration tower, the partial pressure of carbon dioxide is increased, so that incomplete regeneration of the solid absorbent may be caused. There are methods for supplying many heat sources to the regeneration tower or increasing the volume of the regeneration tower so as to prevent the incomplete regeneration, but these methods have a problem in that installation investment costs and operating costs are increased.

DISCLOSURE OF THE INVENTION

Therefore, an object of the present invention is to provide a carbon dioxide separator capable of separating carbon dioxide with high efficiency and high purity from an emission source containing carbon dioxide at not only low concentration but also high concentration.

To achieve these and other advantages and in accordance with the purpose of the present invention, as embodied and broadly described herein, there is provided a carbon dioxide separator including: an absorption tower for producing a carbon dioxide-rich absorbent and a carbon dioxide-depleted flue gas by reaction of a carbon dioxide-containing flue gas and an absorbent contained therein; a regeneration tower for removing the carbon dioxide-rich absorbent transferred from the absorption tower in the presence of a flowing gas to separate the same into a carbon dioxide-rich treatment gas and a carbon dioxide-lean absorbent; and a separation membrane module for selectively membrane-separating and concentrating the carbon dioxide, in which the carbon dioxide-containing flue gas is transferred to the absorption tower as a carbon dioxide-lean flue gas obtained via the separation membrane module, and the flowing gas is transferred to the regeneration tower as the carbon dioxide-rich flue gas obtained via the separation membrane module from the carbon dioxide-containing flue gas.

Further, the present invention also provides a carbon dioxide separator including: an absorption tower for producing a carbon dioxide-rich absorbent and a carbon dioxide-depleted flue gas by reaction of a carbon dioxide-containing flue gas and an absorbent contained therein; a regeneration tower for removing the carbon dioxide-rich absorbent transferred from the absorption tower in the presence of a flowing gas to separate the same into a carbon dioxide-rich treatment gas and a carbon dioxide-lean absorbent; and a separation membrane module for selectively membrane-separating and concentrating the carbon dioxide, in which the carbon dioxide-rich treatment gas to be removed from the regeneration tower and discharged is separated into pure carbon dioxide and a carbon dioxide-lean treatment gas via the separation membrane module, the pure carbon dioxide is discharged to the outside, and the carbon dioxide-lean treatment gas is transferred to the regeneration tower as the flowing gas.

The absorbent may be a dry absorbent.

A concentration of carbon dioxide in the flowing gas may be lower than that of carbon dioxide in the carbon dioxide-rich absorbent.

Pressure inside the absorption tower may be 1 to 30 bar.

Pressure inside the regeneration tower may be 1 to 30 bar.

The separator may further include a first cyclone-type separator for separating the carbon dioxide-rich absorbent and the carbon dioxide-depleted flue gas discharged from the absorption tower.

The separator may further include a second cyclone-type separator for separating the carbon dioxide-rich treatment gas and the carbon dioxide-lean absorbent discharged from the regeneration tower.

The present invention may prevent the separation efficiency of carbon dioxide from being reduced due to the deterioration of an absorbent, an increase in amount of absorbent recycled, the incomplete regeneration of the absorbent caused by the same, and the like even though carbon dioxide is separated from a flue gas containing carbon dioxide at a relatively high concentration (<15%).

Further, the present invention may obtain high-purity carbon dioxide and may increase the regeneration efficiency of the absorbent as a carbon dioxide-containing gas passing through a separation membrane module is used as a flowing gas of a regeneration tower.

In addition, the present invention may lower energy consumed during the process of compressing carbon dioxide finally separated because a regeneration tower and/or an absorption tower are/is operated under pressure.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, the present invention will be described.

The present invention relates to a carbon dioxide separator capable of improving the purity and production amount of carbon dioxide finally obtained by using a separation membrane module to control the concentration of carbon dioxide included in a gas (a flue gas or a gas discharged from a regeneration tower) and using the gas in which the concentration of carbon dioxide is controlled as a flowing gas, an embodiment of the carbon dioxide separator may vary depending on the position at which the separation membrane module is installed, and the carbon dioxide separator will be specifically described as follows.

Figure 1:
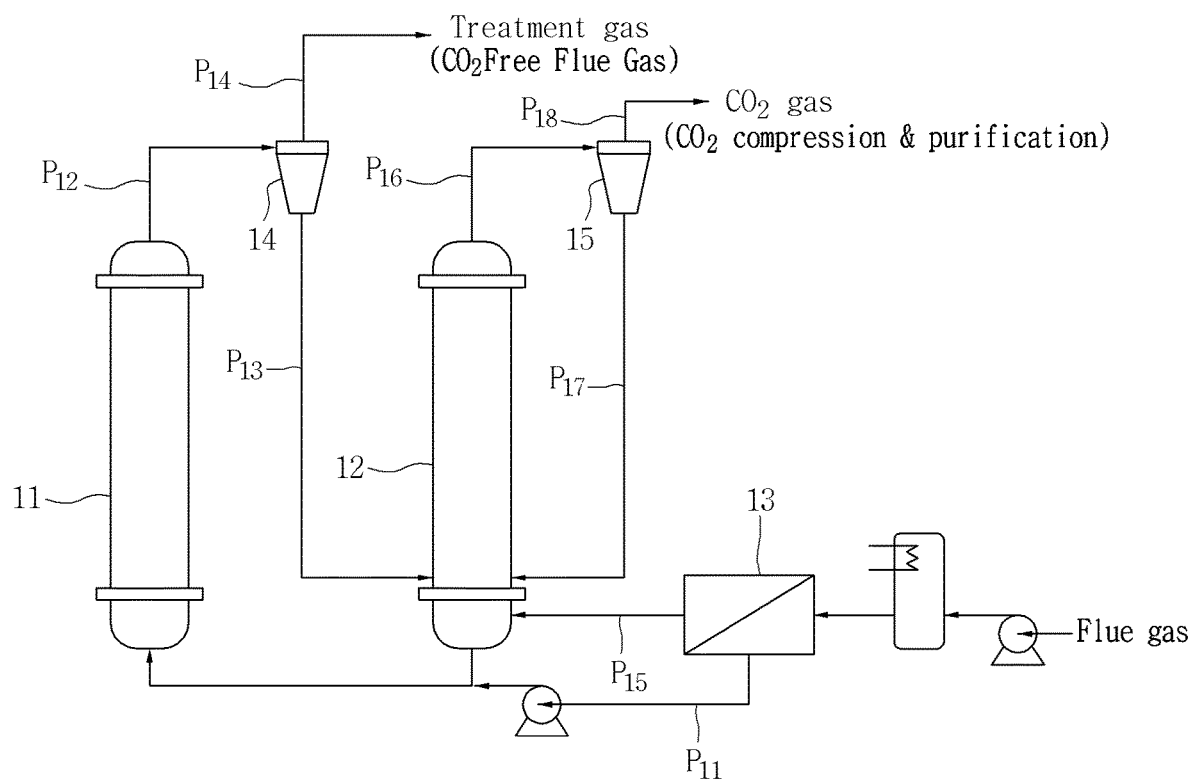
FIG. 1 is a schematic view illustrating a carbon dioxide separator according to an Example of the present invention.

Referring to FIG. 1, a carbon dioxide separator according to an Example of the present invention includes an absorption tower 11, a regeneration tower 12, and a separation membrane module 13.

The absorption tower 11 included in the carbon dioxide separator according to an Example of the present invention produces a carbon dioxide-rich absorbent and a carbon dioxide-depleted flue gas by reaction of a carbon dioxide-containing flue gas and an absorbent contained therein. The carbon dioxide-rich absorbent may be defined as an absorbent which absorbs carbon dioxide included in a flue gas by contact and reaction of a carbon dioxide-containing flue gas flowing in from the outside and the absorbent contained inside the absorption tower 11. Further, the carbon dioxide-depleted flue gas may be defined as a flue gas (a $CO_2$-free flue gas) in which carbon dioxide is removed from the carbon dioxide-containing flue gas.

Here, the carbon dioxide-containing flue gas injected into the absorption tower 11 is a carbon dioxide-lean flue gas obtained via the separation membrane module 13. That is, an initial flue gas passes through the separation membrane module 13 before being injected into the absorption tower 11 and is separated into a carbon dioxide-rich flue gas and a carbon dioxide-lean flue gas, and between them, the carbon dioxide-lean flue gas moves to the absorption tower 11 along a first transfer line P11.

The carbon dioxide-rich flue gas is a flue gas in which carbon dioxide is concentrated while passing through the separation membrane module 13, and may be defined as a flue gas in which a concentration of carbon dioxide is higher (for example, >50%) than that of the initial flue gas. In addition, the carbon dioxide lean-flue gas is a flue gas remaining in the separation membrane module 13, and may be defined as a flue gas in which a concentration of carbon dioxide is lower (for example, <10%) than that of the initial flue gas.

As described above, the present invention may minimize deterioration in performance of the absorbent contained in the absorption tower 11 as compared to the related art in which a flue gas containing carbon dioxide at high concentration is injected as it is into an absorption tower as a carbon dioxide lean-flue gas with carbon dioxide controlled at a concentration lower than that of the flue gas through the separation membrane module 13 is injected into the absorption tower 11.

Meanwhile, the carbon dioxide rich-flue gas which is a flue gas concentrated in the separation membrane module 13 is injected into a flowing gas of the regeneration tower 12 to increase the regeneration efficiency of the absorbent and the purity of carbon dioxide, and a specific description thereon will be made below.

The absorbent contained in the absorption tower 11 is not particularly limited as long as the absorbent is publicly known in the art, but is preferably a dry absorbent. Specifically, as the dry absorbent, it is possible to use one or more selected from the group consisting of alkali metal oxides, alkaline earth metal oxides, alkali metal carbonates, alkaline earth metal carbonates, alkali metal bicarbonates, alkaline earth metal bicarbonates, and precursors thereof.

The absorption tower 11 may be operated at normal pressure, but a pressure regulator (not illustrated) for adjusting the pressure of the absorption tower 11 is provided, so that it is preferred that the absorption tower 11 is operated in a pressurized state within a range of 1 to 30 bar. As the absorption tower 11 is operated in a pressurized state, in the present invention, energy consumed for purifying and compressing carbon dioxide finally separated is reduced, so that it is possible to increase the operation efficiency of the carbon dioxide separator.

The carbon dioxide-rich absorbent and the carbon dioxide-depleted flue gas produced in the absorption tower 11 are discharged to the upper part of the absorption tower 11 and move along a second transfer line P12, and in this case, a first cyclone-type separator 14 for separating a carbon dioxide-rich absorbent and a carbon dioxide-depleted flue gas may be provided in the second transfer line P12. The first cyclone-type separator 14 is not particularly limited as long as the separator is publicly known in the art. As the carbon dioxide-rich absorbent and the carbon dioxide-depleted flue gas are separated through the first cyclone-type separator 14, the present invention may increase the purity and separation efficiency of carbon dioxide.

The carbon dioxide-rich absorbent separated by the first cyclone-type separator 14 is transferred to the regeneration tower 12 along a third transfer line P13, and the carbon dioxide-depleted flue gas is discharged to the outside along a fourth transfer line P14.

The regeneration tower 12 included in the carbon dioxide separator according to an Example of the present invention removes the carbon dioxide-rich absorbent transferred from the absorption tower 11 in the presence of a flowing gas to separate the same into a carbon dioxide-rich treatment gas and a carbon dioxide-lean absorbent. The carbon dioxide-rich treatment gas may be defined as a carbon dioxide-containing gas which is absorbed in a carbon dioxide-rich absorbent and then removed. Further, the carbon dioxide-lean absorbent may be defined as an absorbent (a regenerated absorbent) in which a carbon dioxide-containing gas is removed from a carbon dioxide-rich absorbent.

In the process of removing (regenerating) the carbon dioxide-rich adsorbent into the carbon dioxide-lean absorbent in the regeneration tower 12, a flowing gas is present, and in this case, a carbon dioxide-rich flue gas obtained via the separation membrane module 13 is used as the flowing gas. That is, a carbon dioxide-rich flue gas obtained by passing through the separation membrane module 13 moves and is injected into the regeneration tower 12 along a fifth transfer line P15.

As described above, as a carbon dioxide-rich flue gas with the concentration controlled through the separation membrane module 13 is used as the flowing gas, the present invention may lower the regeneration energy of an absorbent and may also minimize incomplete regeneration of the absorbent as compared to the related art in which the air or a mixed gas of the air and high-purity carbon dioxide is used as the flowing gas.

Here, it is preferred that the concentration of carbon dioxide in the carbon dioxide-rich flue gas used as the flowing gas is lower than that of carbon dioxide in the carbon dioxide-rich absorbent injected into the regeneration tower 12. As the concentration conditions are satisfied, in the present invention, the removal reaction of the carbon dioxide-rich absorbent is smoothly performed, so that the regeneration efficiency of the absorbent may be increased.

The regeneration tower 12 may be operated at normal pressure, but a pressure regulator (not illustrated) for adjusting the pressure of the regeneration tower 12 is provided, so that it is preferred that the regeneration tower 12 is operated in a pressurized state within a range of 1 to 30 bar. As the regeneration tower 12 is operated in a pressurized state, in the present invention, energy consumed for purifying and compressing carbon dioxide finally separated is reduced, so that it is possible to increase the operation efficiency of the carbon dioxide separator.

The carbon dioxide-rich treatment gas and the carbon dioxide-lean absorbent separated from the regeneration tower 12 are discharged to the upper part of the regeneration tower 12 and move along a sixth transfer line P16, and in this case, a second cyclone-type separator 15 for separating the carbon dioxide-rich treatment gas and the carbon dioxide lean-absorbent may be provided in the sixth transfer line P16. The second cyclone-type separator 15 is not particularly limited as long as the separator is publicly known in the art. As the carbon dioxide-rich treatment gas and the carbon dioxide-lean absorbent are separated through the second cyclone-type separator 15, the present invention may increase the purity and separation efficiency of carbon dioxide.

The carbon dioxide-lean absorbent separated by the second cyclone-type separator 15 is recycled into the regeneration tower 12 and/or the absorption tower 11 along a seventh transfer line P17, and the carbon dioxide-rich treatment gas moves along an eighth transfer line P18 and is stored via a purification and compression process, and the like.

The separation membrane module 13 included in the carbon dioxide separator according to an Example of the present invention selectively membrane-separates and concentrates carbon dioxide. Specifically, the separation membrane module 13 is provided at the front ends of the absorption tower 11 and the regeneration tower 12, and thus controls the concentration of carbon dioxide contained in the flue gas. The separation membrane module 13 is not particularly limited as long as the module can control the concentration of carbon dioxide.

Figure 2:
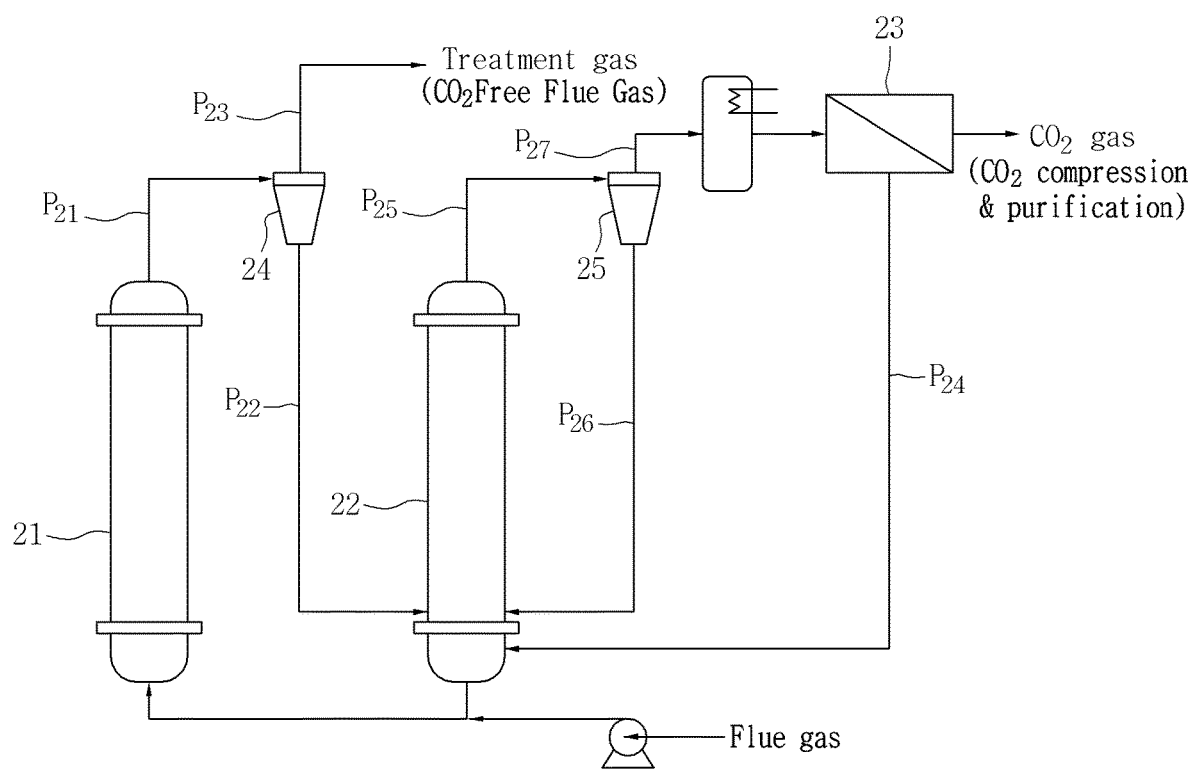
FIG. 2 is a schematic view illustrating a carbon dioxide separator according to another Example of the present invention.

Referring to FIG. 2, a carbon dioxide separator according to another Example of the present invention includes an absorption tower 21, a regeneration tower 22, and a separation membrane module 23.

The absorption tower 21 included in the carbon dioxide separator according to another Example of the present invention produces a carbon dioxide-rich absorbent and a carbon dioxide-depleted flue gas by reaction of a carbon dioxide-containing flue gas and an absorbent contained therein. The carbon dioxide-rich absorbent may be defined as an absorbent which absorbs carbon dioxide included in a flue gas by contact and reaction of a carbon dioxide-containing flue gas flowing in from the outside and the absorbent contained inside the absorption tower 21. Further, the carbon dioxide-depleted flue gas may be defined as a flue gas in which carbon dioxide is removed (a $CO_2$-free flue gas) from the carbon dioxide-containing flue gas.

The absorbent contained in the absorption tower 21 is not particularly limited as long as the absorbent is publicly known in the art, but is preferably a dry absorbent. Specifically, as the dry absorbent, it is possible to use one or more selected from the group consisting of alkali metal oxides, alkaline earth metal oxides, alkali metal carbonates, alkaline earth metal carbonates, alkali metal bicarbonates, alkaline earth metal bicarbonates, and precursors thereof.

The absorption tower 21 may be operated at normal pressure, but a pressure regulator (not illustrated) for adjusting the pressure of the absorption tower 21 is provided, so that it is preferred that the absorption tower 21 is operated in a pressurized state within a range of 1 to 30 bar. As the absorption tower 21 is operated in a pressurized state, in the present invention, energy consumed for purifying and compressing carbon dioxide finally separated is reduced, so that it is possible to increase the operation efficiency of the carbon dioxide separator.

The carbon dioxide-rich absorbent and the carbon dioxide-depleted flue gas produced in the absorption tower 21 are discharged to the upper part of the absorption tower 21 and move along a first transfer line P21, and in this case, a first cyclone-type separator 24 for separating a carbon dioxide-rich absorbent and a carbon dioxide-depleted flue gas may be provided in the first transfer line P21. The first cyclone-type separator 24 is not particularly limited as long as the separator is publicly known in the art. As the carbon dioxide-rich absorbent and the carbon dioxide-depleted flue gas are separated through the first cyclone-type separator 24, the present invention may increase the purity and separation efficiency of carbon dioxide.

The carbon dioxide-rich absorbent separated by the first cyclone-type separator 24 is transferred to the regeneration tower 22 along a second transfer line P22, and the carbon dioxide-depleted flue gas is discharged to the outside along a third transfer line P23.

The regeneration tower 22 included in the carbon dioxide separator according to still another Example of the present invention removes the carbon dioxide-rich absorbent transferred from the absorption tower 21 in the presence of a flowing gas to separate the same into a carbon dioxide-rich treatment gas and a carbon dioxide-lean absorbent. The carbon dioxide-rich treatment gas may be defined as a carbon dioxide-containing gas which is absorbed in a carbon dioxide-rich absorbent and then removed. Further, the carbon dioxide-lean absorbent may be defined as an absorbent (a regenerated absorbent) in which a carbon dioxide-containing gas is removed from a carbon dioxide-rich absorbent.

In the process of removing (regenerating) the carbon dioxide-rich adsorbent into the carbon dioxide-lean absorbent in the regeneration tower 22, a flowing gas is present, and in this case, a carbon dioxide-lean flue gas obtained via the separation membrane module 23 is used as the flowing gas. That is, the carbon dioxide-rich treatment gas discharged from the regeneration tower 22 passes through the separation membrane module 23 to separate the same into pure carbon dioxide and a carbon dioxide-lean treatment gas, and in this case, the separated carbon dioxide-lean treatment gas moves and is injected into the regeneration tower 22 along a fourth transfer line P24, and thus is used as the flowing gas.

As described above, as a carbon dioxide-lean treatment gas with the concentration controlled through the separation membrane module 23 is used as the flowing gas, the present invention may lower the regeneration energy of an absorbent and may also minimize incomplete regeneration of the absorbent as compared to the related art in which the air or a mixed gas of the air and high-purity carbon dioxide is used as the flowing gas.

Here, it is preferred that the concentration of carbon dioxide in the carbon dioxide-lean treatment gas used as the flowing gas is lower than that of carbon dioxide in the carbon dioxide-rich absorbent injected into the regeneration tower 22. As the concentration conditions are satisfied, in the present invention, the removal reaction of the carbon dioxide-rich absorbent is smoothly performed, so that the regeneration efficiency of the absorbent may be increased.

The regeneration tower 22 may be operated at normal pressure, but a pressure regulator (not illustrated) for adjusting the pressure of the regeneration tower 22 is provided, so that it is preferred that the regeneration tower 22 is operated in a pressurized state within a range of 1 to 30 bar. As the regeneration tower 22 is operated in a pressurized state, in the present invention, energy consumed for purifying and compressing carbon dioxide finally separated is reduced, so that it is possible to increase the operation efficiency of the carbon dioxide separator.

The carbon dioxide-rich treatment gas and the carbon dioxide-lean absorbent separated from the regeneration tower 22 are discharged to the upper part of the regeneration tower 22 and move along a fifth transfer line P25, and in this case, a second cyclone-type separator 25 for separating the carbon dioxide-rich treatment gas and the carbon dioxide lean-absorbent may be provided in the fifth transfer line P25. The second cyclone-type separator 25 is not particularly limited as long as the separator is publicly known in the art. As the carbon dioxide-rich treatment gas and the carbon dioxide-lean absorbent are separated through the second cyclone-type separator 25, the present invention may increase the purity and separation efficiency of carbon dioxide.

The carbon dioxide-lean absorbent separated by the second cyclone-type separator 25 is recycled into the regeneration tower 22 and/or the absorption tower 21 along a sixth transfer line P26, and the carbon dioxide-rich treatment gas moves to the separation membrane module 23 along a seventh transfer line P27. When the carbon dioxide-rich treatment gas passes through the separation membrane module 23, the carbon dioxide-rich treatment gas is separated into pure carbon dioxide and a carbon dioxide-lean treatment gas, and the separated pure carbon dioxide is stored via a purification and compression process, and the like.

The separation membrane module 23 included in the carbon dioxide separator according to yet another Example of the present invention selectively membrane-separates and concentrates carbon dioxide. Specifically, the separation membrane module 23 is provided at the rear ends of the absorption tower 21 and the regeneration tower 22, and thus controls the concentration of carbon dioxide contained in the carbon dioxide-rich treatment gas discharged from the regeneration tower 22. The separation membrane module 23 is not particularly limited as long as the module can control the concentration of carbon dioxide.

Hereinafter, the present invention will be described in detail as follows through the Examples. However, the following Examples are only for exemplifying the present invention, and the present invention is not limited by the following Examples.

Example 1

Carbon dioxide was separated by using a carbon dioxide separator having the structure illustrated in FIG. 1. Specifically, by passing a flue gas having a carbon dioxide concentration of 13.5 vol % through a separation membrane module, a first gas having a low concentration of carbon dioxide was allowed to move to an absorption tower (operation temperature: 70° C.) and a second gas having a high concentration of carbon dioxide as a flowing gas was allowed to move to a regeneration tower (operation temperature: 210° C.). The absorption tower was operated such that the removal rate of carbon dioxide in the absorption tower was about 50%, and a silica-based separation membrane module was used as the separation membrane module and a potassium carbonate-based solid absorbent was used as the absorbent.

Example 2

Carbon dioxide was separated by using a carbon dioxide separator having the structure illustrated in FIG. 2. Specifically, after a flue gas having a carbon dioxide concentration of 13.5 vol % was allowed to react with an absorbent by supplying the flue gas to an absorption tower (operation temperature: 70° C.), the flue gas was allowed to move to a regeneration tower (operation temperature: 210° C.). Thereafter, by passing a carbon dioxide-containing gas discharged from the regeneration tower through a separation membrane module, a first gas having a high concentration of carbon dioxide was discharged to the outside, and a second gas having a low concentration of carbon dioxide as a flowing gas was allowed to move to the regeneration tower. The absorption tower was operated such that the removal rate of carbon dioxide in the absorption tower was about 50%, and a silica-based separation membrane module was used as the separation membrane module and a potassium carbonate-based solid absorbent was used as the absorbent.

Example 3

Carbon dioxide was separated under the same conditions as in Example 2, except that a flue gas having a carbon dioxide concentration of 30.3 vol % was used and the absorption tower was operated in a state where a pressure of 20 bar was applied.

Comparative Example 1

Carbon dioxide was separated under the same conditions as in Example 1, except that in the structure illustrated in FIG. 1, a carbon dioxide separator excluding the separation membrane module was used and the air was used as a flowing gas of the regeneration tower.

Comparative Example 2

Carbon dioxide was separated under the same conditions as in Example 3, except that in the structure illustrated in FIG. 2, a carbon dioxide separator excluding the separation membrane module was used and the air was used as a flowing gas of the regeneration tower.

Experimental Example 1

The concentrations of carbon dioxide according to the operation of the carbon dioxide separator were analyzed by a gas analyzer, the amounts of carbon dioxide produced per day were measured, and the results thereof are shown in the following Table

TABLE 1

|  | Concentration (vol %) of $CO_2$ contained in the flue gas | Concentration (vol %) of $CO_2$ contained in the first gas (permeating gas) | Concentration (vol %) of $CO_2$ contained in the second gas (residual gas) | Concentration (vol %) of $CO_2$ at the rear end of the regeneration tower | Concentration (vol %) of $CO_2$ at the rear end of the second cyclone-type separator | Amount (ton/day) of $CO_2$ produced |
|---|---|---|---|---|---|---|
| Example 1 | 13.5 | 29.5 | 11.3 | 80.7 | 80.7 | 2.19 |
| Example 2 | 13.5 | 83.1 | 18.1 | 68.4 | 83.1 | 2.33 |
| Example 3 | 30.3 | 89.4 | 24.8 | 74.1 | 85.2 | 2.95 |
| Comparative Example 1 | 13.5 | — | — | 28.7 | 28.7 | Not liquefied |
| Comparative Example 2 | 30.3 | — | — | 38.6 | 38.6 | Not liquefied |

Referring to Table 1, it can be confirmed that as the carbon dioxide separator according to the present invention is used, high-purity carbon dioxide is separated at high efficiency.

The invention claimed is:

1. A carbon dioxide separation system comprising:
an absorption tower for producing a carbon dioxide-rich absorbent and a carbon dioxide-depleted flue gas by reaction of a carbon dioxide-containing flue gas and an absorbent contained therein; a regeneration tower for removing the carbon dioxide-rich absorbent transferred from the absorption tower in the presence of a flowing gas to separate the same into a carbon dioxide-rich treatment gas and a carbon dioxide-lean absorbent; and a separation membrane module for selectively membrane-separating and concentrating the carbon dioxide, wherein the carbon dioxide-containing flue gas is transferred to the absorption tower as a carbon dioxide-lean flue gas obtained via the separation membrane module, and the flowing gas is transferred to the regeneration tower as the carbon dioxide-rich flue gas obtained via the separation membrane module from the carbon dioxide-containing flue gas.

2. The carbon dioxide separation system of claim 1, wherein the absorbent is a dry absorbent.

3. The carbon dioxide separation system of claim 1, wherein a concentration of carbon dioxide in the flowing gas is lower than that of carbon dioxide in the carbon dioxide-rich absorbent.

4. The carbon dioxide separation system of claim 1, wherein pressure inside the absorption tower is 1 to 30 bar.

5. The carbon dioxide separation system of claim 1, wherein pressure inside the regeneration tower is 1 to 30 bar.

6. The carbon dioxide separation system of claim 1, further comprising a first cyclone-type separator for separating a carbon dioxide-rich absorbent and a carbon dioxide-depleted flue gas discharged from the absorption tower, wherein the carbon dioxide-rich absorbent is transferred to the regeneration tower and the carbon dioxide-depleted flue gas is discharged to the outside.

7. The carbon dioxide separation system of claim 1, further comprising a second cyclone-type separator for separating the carbon dioxide-rich treatment gas and the carbon dioxide-lean absorbent discharged from the regeneration tower, wherein the carbon dioxide-rich treatment gas is discharged to the outside, and the carbon dioxide-lean absorbent is recycled to the regeneration tower.

8. A carbon dioxide separation system comprising: an absorption tower for producing a carbon dioxide-rich absorbent and a carbon dioxide-depleted flue gas by reaction of a carbon dioxide-containing flue gas and an absorbent contained therein; a regeneration tower for removing the carbon dioxide-rich absorbent transferred from the absorption tower in the presence of a flowing gas to separate the same into a carbon dioxide-rich treatment gas and a carbon dioxide-lean absorbent; and a separation membrane module for selectively membrane-separating and concentrating the carbon dioxide, wherein the carbon dioxide-containing flue gas is transferred to the absorption lower as a carbon dioxide-lean flue gas obtained via the separation membrane module, the carbon dioxide-rich treatment gas to be removed from the regeneration tower and discharged is separated into pure carbon dioxide and a carbon dioxide-lean treatment gas via the separation membrane module, the pure carbon dioxide is discharged to the outside, and the carbon dioxide-lean treatment gas is transferred to the regeneration tower as the flowing gas.

9. The carbon dioxide separation system of claim 8, wherein the absorbent is a dry absorbent.

10. The carbon dioxide separation system of claim 8, wherein a concentration of carbon dioxide in the flowing gas is lower than that of carbon dioxide in the carbon dioxide-rich absorbent.

11. The carbon dioxide separation system of claim 8, wherein pressure inside the absorption tower is 1 to 30 bar.

12. The carbon dioxide separation system of claim 8, wherein pressure inside the regeneration tower is 1 to 30 bar.

* * * * *